Feb. 4, 1941.    H. K. BIGELOW    2,230,824
BRAKE SHOE DRESSER
Filed May 8, 1939    3 Sheets-Sheet 1
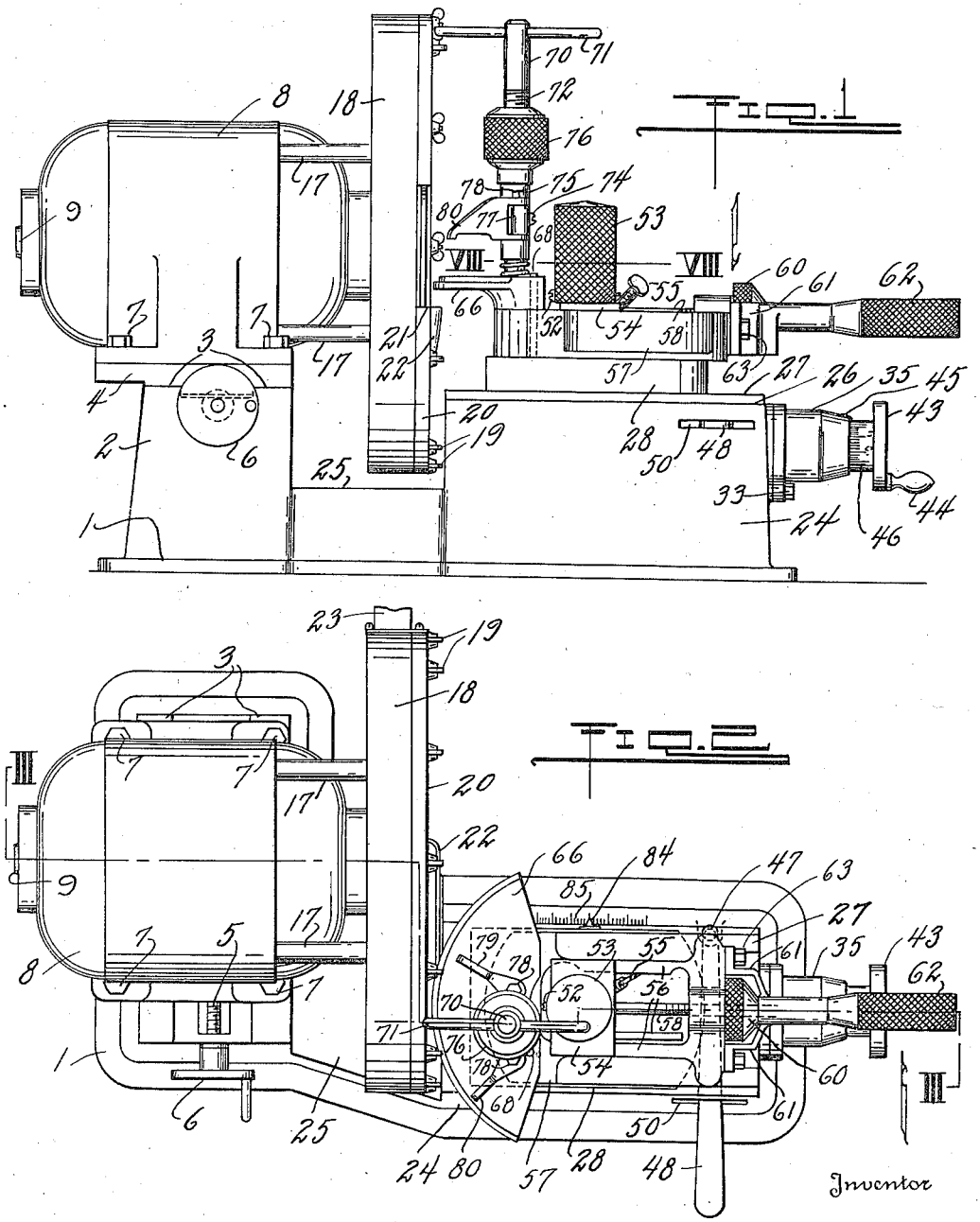
Inventor
Harry K. Bigelow
By
Attorney Feb. 4, 1941.   H. K. BIGELOW   2,230,824
BRAKE SHOE DRESSER
Filed May 8, 1939   3 Sheets-Sheet 2

Inventor
Harry K. Bigelow
By
Geo E Kirk
Attorney

Feb. 4, 1941.                H. K. BIGELOW                2,230,824
                           BRAKE SHOE DRESSER
                          Filed May 8, 1939            3 Sheets-Sheet 3
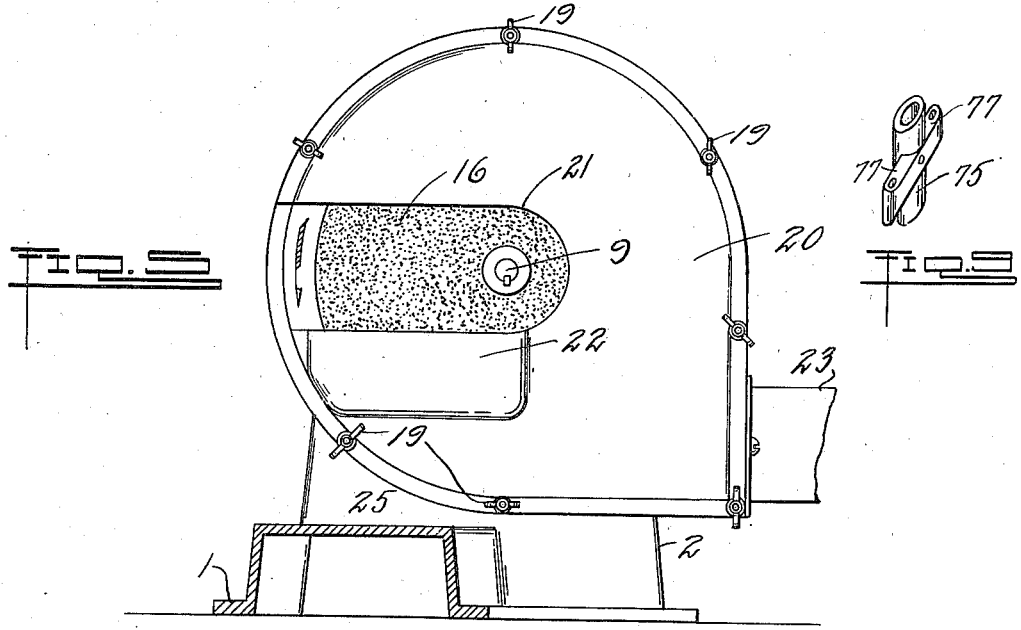
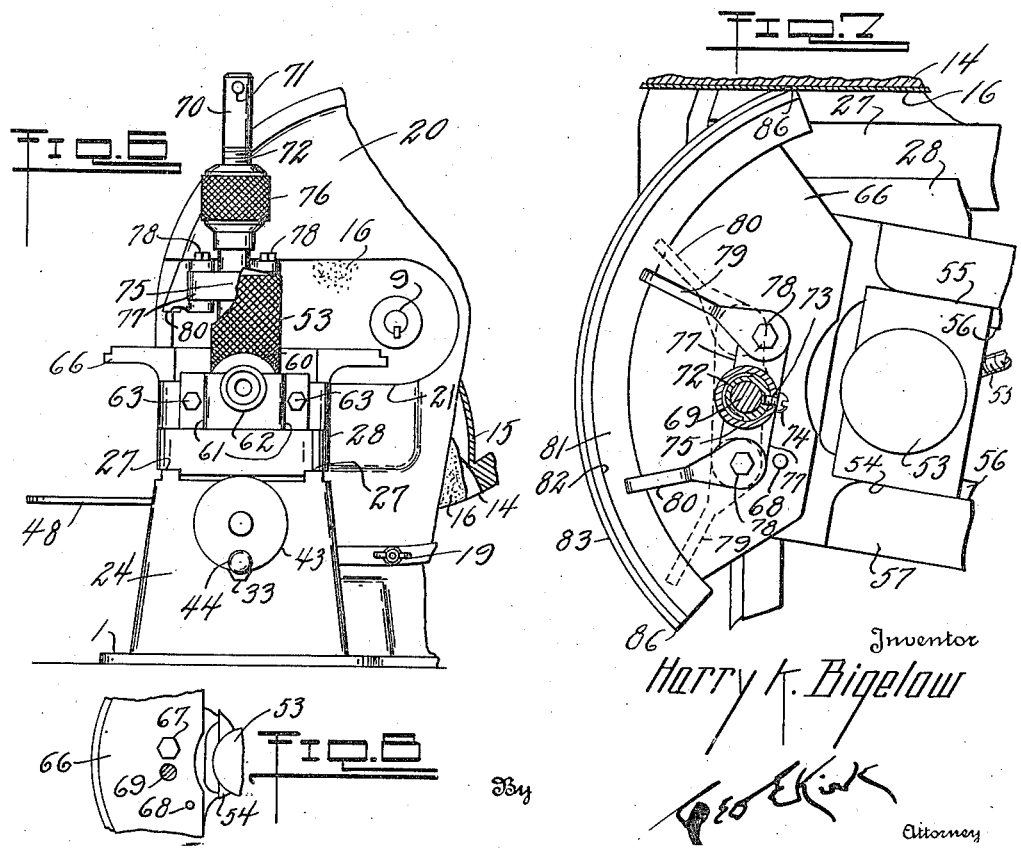
Inventor
Harry K. Bigelow
By Geo E Kirk
Attorney Patented Feb. 4, 1941

2,230,824

UNITED STATES PATENT OFFICE 2,230,824

BRAKE SHOE DRESSER

Harry K. Bigelow, Columbus, Ohio, assignor of one-half to Benjamin S. Lurie, Columbus, Ohio Application May 8, 1939, Serial No. 272,451

5 Claims. (Cl. 51—124)

This invention relates to method and apparatus for acting upon surfaces of special contour.

This invention has utility when having to do with brake shoes, more especially for motor vehicles in conditioning or reconditioning such shoes, usually as to shoes of arc form to be operated within the overhang of a brake drum.

Referring to the drawings:

Fig. 1 is a side elevation of an embodiment of the invention as a power tool for readily operating on brake shoes;

Fig. 2 is a plan view of the device of Fig. 1;

Fig. 3 is a section on the line III—III, Fig. 2, showing the abrading wheel and brake shoe mounting features;

Fig. 4 is a section on the line IV—IV, Fig. 3, showing the eccentric mounting for the oscillator carrier for the brake shoe;

Fig. 5 is a section on the line V—V, Fig. 3, showing the window to the abrader wheel or disk;

Fig. 6 is a view from the right of Fig. 1, certain parts being broken away;

Fig. 7 is a section on the line VII—VII, Fig. 3, showing the carrier for the brake shoe;

Fig. 8 is a section on the line VIII—VIII, Fig. 1; and

Fig. 9 is a perspective view of the two arm mounting for the clamp from which the fingers extend.

Base or frame 1 (Fig. 1) has an upstanding portion 2 providing parallel guides 3 as a deck upon which is mounted complementary guide member 4 actuable by threaded screw stem 5 for adjustment to and fro upon rotation of hand wheel 6. This complementary guide member 4 or table section has mounted thereon by bolts 7 motor 8 having a shaft 9. Yieldable holding of this adjustable motor section is effected through threaded stem 10 (Fig. 3) having thereon compression helical spring 11 between washers 12 which may be adjusted by nuts 13. This shaft 9, protruding from the motor 8, has fixed thereon disk 14 having radiating fan blades 15. On the opposite face this disk 14 has adhesively attached thereto sand paper or emery cloth 16. Bolts 17 from the motor 3 carry a housing 18, to which is connected by wing bolts 19 a front plate 20 having a radial window 21 (Fig. 5) with a scoop extension 22 along the lower portion thereof. Accordingly, during the counter-clockwise rotation of this abrading disk 16 the material removed from the work is drawn by suction of the fan blades 15 to be expelled through duct 23.

The frame or base 1 additionally has a riser portion 24 spaced by a dip portion 25 from the upright 2. There is thus clearance for the abrader device. This riser portion 24 provides a second deck 26 with parallel guides 27 (Figs. 3, 6) for directing a primary reciprocable table section 28. This table section 28 centrally therein carries a sleeve 29 about stem 30 which has a head 31 which functions as a nut for threaded stem 32. Bolt 33 mounts collar 34 on the riser portion 24 remote from the riser portion 2. Extending from this collar 34 is a tubular guide 35. Washer 36 is thrust toward the collar 34 by a helical spring 37 on the stem 32 and anchored thereto by pin 38. There is a tendency to draw the threaded stem 32 outward and such movement is limited by washer 39 held by nut 40 on the opposite side of the collar 34. Set screw 41 in a groove 42 may lock the angular position of disk 43 carrying handle 44. This tubular portion 35 carries a pointer 45 for scale 46 (Fig. 1), carried by the disk 43. Within this upright 24 is a pivot pin or fulcrum 47 (Fig. 2) for lever 48, located in proximity to the threaded stem 32 between the nut 40 and nut 49. This lever 48 extends from this fulcrum 47 not only past the stem 32 but through opening 50 in the riser portion 24 to protrude as a handle. This is a manual means for overcoming the action of the helical spring 37 in shifting the table 28 toward the abrader.

On the sleeve 29 there is an eccentric 51 (Figs. 3, 4) having a connection by screw 52 with the knurled cap 53 permitting manual adjustment of this eccentric 51 rotatively on the sleeve 29, thereby to vary the position of block 54 which provides the bearing for the exterior of this eccentric 51. After such adjustment is made, wing bolt 55 acting as a set screw may lock this block 54 to the eccentric 51 at such adjusted position. This block 54 (Fig. 2) is directed by guides 56 in the secondary table 57. The position of this block 54 relative to the oscillable table section 57 is determined by a stem 58 extending loosely through guide 59 (Fig. 3) in the table section 57 and carrying a knurled nut 60. This nut 60 is embraced by arms 61 from handle 62 which is fastened by bolts 63 to this oscillable frame 57. Nuts 64 on the stem 30 are spaced from the eccentric 51 by thrust bearing 65. There is thus freedom for oscillation of this secondary table 57. Upon swinging the handle 62 this oscillation is about the stem 30 as an axis.

Fixed with this oscillable table 57 toward the abrader is a seat or templet 66 anchored therewith by bolt 67 (Fig. 6) and dowel pin 68. The angular position for this templet 66 is thus fixed. From this seat 66 there arises stem 69 terminally threaded in this seat 66 and upwardly carrying a shoulder providing enlargement 70 and an operating handle 71. About this stem 69 is an externally threaded sleeve 72 having a key way 73 engaged by a screw key 74 of cross arm device 75. The rotation of the handle 71 (Figs. 1, 3) counter-clockwise will release the sleeve 72 so that the cross arm device 75 may be given a desired angular relation. An operation of this handle 71 clockwise then clamps this sleeve 72 so that the cross arm device 75 may not be angularly shifted but it is free to move axially. Knurled nut 76 on this threaded sleeve 72 may be effective as a clamp to thrust the cross arm device 75 down and hold such. This downward action is effective for engaging the work. The cross arm device 75 has a central tubular portion and a pair of arms 77, terminally carrying clamp bolts 78 for clamping fingers 79, 80. It is thus possible to swing these clamping fingers 79 and 80 into desired angular relation relative to the cross arm device 75, and, as so held, bring such fingers 79 and 80 terminally against web 81 of brake shoe 82 having a brake gripping or engaging surface 83 to be dressed, finished or burnished.

In the carrying out of work hereunder, there is a purpose in accurately locating the brake shoe 82 for the desired operation. Index or pointer 84 is along graduations 85 (Fig. 2) proper for the radius dimension. Adjustment to bring the shoe 82 to medial position is desirably one which does not take place at the hand wheel 44 but at the nut 60 in thereby shifting the block 54 in the secondary table 57. Then as such refinement is determined, the set screw 55 may lock such eccentric 51. It may be in order then to determine that the initial placing of the brake shoe 82 is proper on this seat 66. As such is determined from the angular location of clamp 69 and the down clamp nut 76, matters may be in readiness for operation. The motor 8 may then be thrown in for starting and the handle 62 swung to and fro to have the abrader effective crosswise of the face to be burnished or finished as such face is shifted. In this operation the action of the abrading disk 16 is largely local to a definite radial point on such disk. Effective wearing down of the disk 16 throughout its entire diameter is possible hereunder by varying this radial position of the work as to the disk 16. This is effected by shifting of the motor 8, effected through the hand wheel 6. As there is similarity for a set of brake shoes in the placing or running through a set it is only necessary to release the nut 76, remove the brake shoe 82, and replace it by the substitute or succeeding shoe to be dressed.

In the carrying out of the invention herein, it is desirable that the terminal portions 86 of the brake shoe 82 be beveled off or skived and this operation is preferably one which occurs before the dressing of the intermediate portion of the brake shoe 82. Lever 48 may be operated when the handle 62 has located a terminal portion 86 of the brake shoe 82 in the vicinity of the abrading tool 16.

In the initial placing of the table 57 as determined by the pointer 84 on the scale 85, such may be taken as an initial position effected through the operation of the hand wheel 44. For facilitating subsequent operation, say with other similarly dimensioned shoes, it may be advantageous to back off the set screw 41, thereby releasing the disk 43 so that its set position will be such that the scale 46 will read zero at the pointer 45. Accordingly, there is facility for ready subsequent placing or noting this departure from such initial placing in the event there be occasion to shift the reciprocable or primary table or carrier section 28 mounting the secondary or oscillating table or carrier 57.

It is to be noted (Fig. 7) that the plate 66 is of different length from the shoe 82 being acted upon. In the disclosure in this case, it is thus to be noted that the plate 66 may be for a range of different shoes and that these shoes may depart therefrom as to the arc extent even to be less, equal to or greater than the over all length of the arc of the plate 66. However, in practice it is usually desirable that the plate 66 be of an extent shorter than that of the shoe being acted upon. Thereby it is effective to allow the ends of the shoes 82 to become deformed.

What is claimed and it is desired to secure by United States Letters Patent is:

1. A power tool comprising an abrading disk, a deck adjacent the disk, work holding means on said deck including a pivot bearing, an adjustable eccentric on the bearing, and a carrier mounted on said eccentric to swing relatively to the disk on said bearing as a pivot, whereby different positions for the carrier on the eccentric determine different radius arc relationships for the work to be acted upon by the abrading disk.

2. A power tool comprising an abrading disk, a deck adjacent the disk, work holding means on said deck including a pivot bearing, an adjustable eccentric on the bearing, a carrier mounted on said eccentric to swing relatively to the disk on said bearing as a pivot and a work locating clamp on the carrier, whereby different positions for the carrier on the eccentric determine different radius arc relationships for the work to be acted upon by the abrading disk.

3. A power tool comprising an abrading disk, a deck adjacent the disk, work holding means on said deck including a pivot bearing, an adjustable eccentric on the bearing, a carrier mounted on said eccentric to swing relatively to the disk on said bearing as a pivot, a primary locating clamp on the carrier, and a secondary clamp on the carrier coaxial with the primary clamp and independently brought to gripping position for positioning work, whereby different positions for the carrier on the eccentric determine different radius arc relationships for the work to be acted upon by the abrading disk.

4. A power tool comprising an abrading disk, a deck adjacent the disk, work holding means on said deck including a pivot bearing, an adjustable eccentric on the bearing, a carrier mounted on said eccentric to swing relatively to the disk on said bearing as a pivot, a work locating clamp on the carrier, and a plurality of swingable fingers positioned by said clamp, whereby different positions for the carrier on the eccentric determine different radius arc relationships for the work to be acted upon by the abrading disk.

5. A power tool comprising an abrading disk, a deck adjacent the disk, work holding means on said deck including a pivot bearing, an adjustable eccentric on the bearing, a carrier mounted on said eccentric to swing relatively to the disk on said bearing as a pivot, a work locating clamp on the carrier, and a plurality of swingable fingers positioned by said clamp, there being an adjustable mounting for the fingers, whereby different positions for the carrier on the eccentric determine different radius arc relationships for the work to be acted upon by the abrading disk.

HARRY K. BIGELOW.